United States Patent
Koc et al.

(10) Patent No.: US 8,346,290 B2
(45) Date of Patent: Jan. 1, 2013

(54) UPLINK POWER CONTROL FOR WIRELESS SYSTEMS

(75) Inventors: Ali Taha Koc, Hillsboro, OR (US); Shilpa Talwar, Santa Clara, CA (US); Changho Suh, Albany, CA (US)

(73) Assignee: Intel Corporation, Santa Clara, CA (US)

( * ) Notice: Subject to any disclaimer, the term of this patent is extended or adjusted under 35 U.S.C. 154(b) by 861 days.

(21) Appl. No.: 12/378,382

(22) Filed: Feb. 13, 2009

(65) Prior Publication Data

US 2010/0210295 A1 Aug. 19, 2010

(51) Int. Cl.
    *H04B 7/185* (2006.01)
(52) U.S. Cl. ............ 455/522; 455/150.1; 455/214; 455/430; 370/235; 370/318; 370/333
(58) Field of Classification Search .......... 455/436–438, 455/447, 449, 453, 442–445, 450–452.2, 455/448, 501, 509, 422.1; 370/329, 331, 370/333, 334, 310.2, 319, 322, 328
See application file for complete search history.

(56) References Cited

U.S. PATENT DOCUMENTS

| | | | |
|---|---|---|---|
| 2005/0272432 A1* | 12/2005 | Ji et al. | 455/449 |
| 2006/0094372 A1* | 5/2006 | Ahn et al. | 455/67.13 |
| 2006/0135169 A1* | 6/2006 | Sampath et al. | 455/447 |
| 2006/0234752 A1* | 10/2006 | Mese et al. | 455/522 |
| 2007/0270100 A1* | 11/2007 | Agrawal et al. | 455/67.11 |

OTHER PUBLICATIONS

Suh, Changho et al. "Distributed Uplink Power Control for OFDMA Cellular Systems," pp. 1-5, Sep. 2008.

* cited by examiner

*Primary Examiner* — Shawki Ismail
*Assistant Examiner* — Christopher Lo
(74) *Attorney, Agent, or Firm* — Blakely, Sokoloff, Taylor & Zafman LLP

(57) ABSTRACT

Techniques are described that can be used to determine a transmitter power level of a mobile station at cell edge. To determine transmitter power level, the technique considers at least a balance of power transmitted by mobile stations near cell edge and power transmitted by mobile stations closer to cell center, target mean received power by the base station from mobile stations near center cell, target mean power transmitted from cell edge mobile stations, signal-to-interference-power ratio between signals transmitted from base stations of different cells to the mobile station at cell edge, and channel gain.

21 Claims, 2 Drawing Sheets

UPLINK POWER CONTROL FOR WIRELESS SYSTEMS

FIELD

The subject matter disclosed herein relates generally to techniques to determine transmitter power of a wireless signal.

RELATED ART

In wireless networks, determination of wireless signal strength is an important decision. Because the same frequency band is used to transmit signals, increasing transmission power of one mobile station (MS) enjoys the increase of its link performance but increases interferences to other mobile stations of neighboring base stations. This results in decreased link performance of the other mobile stations. Increasing the transmission power for a mobile station at the edge of a cell can increase interference with a mobile station at the edge of another cell. Therefore, in deciding transmission power, it is desirable to consider whether a mobile station is at an edge of a cell in deciding the transmission power of that mobile station.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
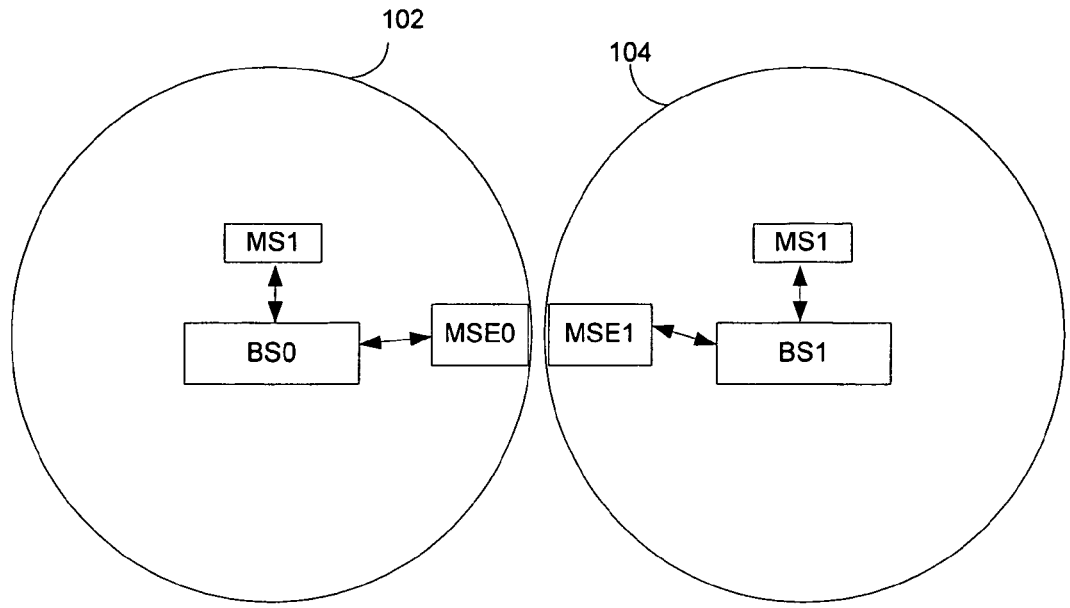
FIG. 1 depicts a system having two wireless network cells.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, and 802.11n.

FIG. 1 depicts a system 100 having two wireless network cells, cells 102 and 104. Cell 102 includes base station BS0 that communicates with mobile stations MS0 and MSE0. Cell 104 includes base station BS1 that communicates with mobile stations MS1 and MSE1. Mobile stations MS0 and MS1 are approximately located in the center of respective cells 102 and 104. Mobile stations MSE0 and MSE1 are located at the edges of respective cells 102 and 104. When mobile stations MSE0 and MSE1 share a transmission channel, transmissions from mobile stations MSE0 and MSE1 can interfere with one another. Some embodiments determine transmitter power of a mobile station at the edge of a cell by considering at least a balance of power transmitted by mobile stations near cell edge and power transmitted by mobile stations closer to cell center, target mean received power by the base station from mobile stations near center cell, target mean power transmitted from cell edge mobile stations, signal-to-interference-power ratio between signals transmitted from base stations of different cells to the mobile station at cell edge, and channel gain.

Figure 2:
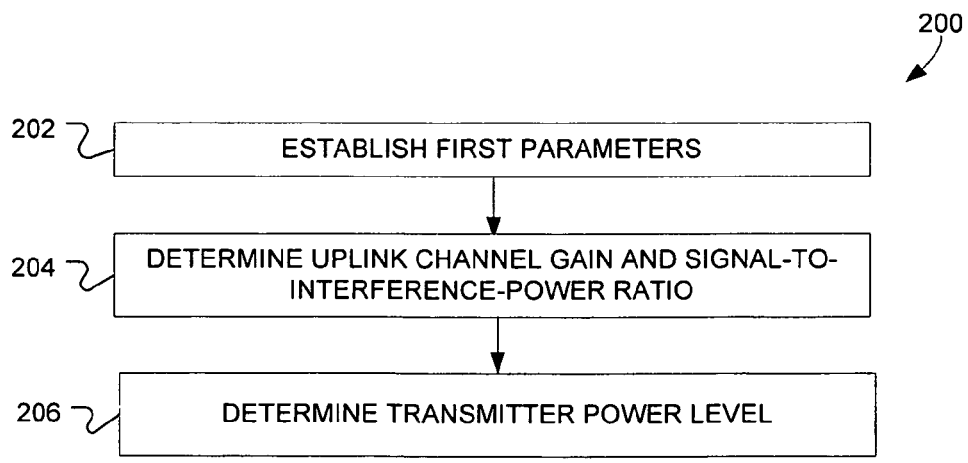
FIG. 2 depicts a process that can be used to determine a transmitter power for a mobile station at the edge of a cell, in accordance with an embodiment.

FIG. 2 depicts a process 200 that can be used to determine a transmitter power for a mobile station at the edge of a cell, in accordance with an embodiment. Block 202 may include establishing first parameters used to determine the transmitter power for a mobile station at cell edge. For example, the first parameters may include parameters $\gamma$, $P_0$, and $P_1$.

Parameter $\gamma$ may establish a balance between power transmitted by mobile stations near cell edge and power transmitted by mobile stations closer to cell center. Parameter $\gamma$ is a design weighting parameter between 0 and 1. The closer parameter $\gamma$ is to 1, the higher the power transmitted by a mobile station near cell edge. When parameter γ is 1, the mobile station near cell edge transmits at a higher power level than that of mobile stations near center cell. Conversely, when the closer parameter γ is closer to 0, the mobile station near cell edge transmits at a lower power level compared to that of mobile stations near center cell. When parameter γ is 0.5, mobile stations at cell edge and center cell transmit at approximately the same level to a base station.

Parameter $P_0$ represents target mean received power (mW) by the base station from mobile stations near center cell. Parameter $P_1$ represents the target mean power (mW) transmitted from cell edge mobile stations.

The first parameters may be determined by either a base station or a mobile station. Determination of whether a mobile station is at cell edge can be made in a variety of ways including using global positioning systems or identifying the mobile station at cell edge because the mobile station at cell edge has a higher path loss relative to other mobile stations, such as mobile stations closer to the center of cell edge.

In some cases, the first parameters include parameter β instead of parameter γ. Like parameter γ, parameter β controls transmitted power by a mobile station at cell edge compared to transmitted power by a mobile station near center cell. Parameter β is between 0 and 1.

Block 204 may include determining uplink channel gain and signal-to-interference-power ratio for the mobile station at cell edge. Uplink channel gain is the channel gain from the mobile station to the desired base station. The mobile station can estimate uplink channel gain from downlink channel gain. Downlink channel gain can be determined from preambles or pilots in data transmitted from a base station to the cell edge mobile station. A mobile station can determine downlink channel gain by comparing received power level of preamble or pilot with the standard, known transmitted power level of a preamble or pilot. The mobile station can use minimum mean square error estimation (MMSE) or correlation-based estimation to determine the downlink channel gain.

Signal-to-interference-power ratio, $SIR_{DL}$, indicates measured signal-to-interference-power ratio between signals transmitted from a base station to the mobile station at cell edge. Signal-to-interference-power ratio can be measured using a preamble or pilot transmitted from the desired base station and base stations of other cells. For example, with respect to the system of FIG. 1, to determine $SIR_{DL}$, MSE0 decodes a preamble from BS0 and another preamble from BS1.

The following describes a manner to determine SIR from preambles from multiple base stations. The received signal Y of two received preambles is represented as:

$$Y = H0*P0 + H1*P1 + N$$

where,
H0 is a channel condition from base station 0, BS0, to the mobile station,
P0 is the preamble from base station 0,
H1 is a channel condition from base station 1, BS1 to the mobile station,
P1 is the preamble from base station 1, and
N is noise.

A channel condition may be the summation of effects of path loss, Rayleigh channel, and shadowing between the transmitter and receiver. Channel conditions may be measured in dB.

Preambles are orthogonal and unitary. For the mobile station to estimate the channel condition H0, the received signal is multiplied with P0', the conjugate of P0. To determine the estimated channel condition H0, the following relationship can be used:

$$\text{Estimate of } H0 = Y*P0' = H0*P0*P0' + H1*P1*P0' + N*P0'.$$

P0 and P1 are orthogonal, so P0*P1'=0. In addition, P0 is unitary, so P0*P0'=1. Accordingly, the estimated channel condition H0 can be represented as:

$$H1 + N*P1'.$$

The estimate of channel condition H0 is the actual channel condition H1 plus noise. If the user wants to estimate the channel condition H1, the received signal is multiplied with P1' such that the estimated channel condition H1 is represented as Y*P1'. $SIR_{DL}$ can be approximated by H0/H1 in linear scale or H0−H1 in dB scale.

Block 206 may include the mobile station at cell edge determining transmitter power level output from the antenna of the mobile station based on the parameters from blocks 202 and 204. In one embodiment, the mobile station at cell edge determines transmitter power level using the following linear combination scheme described with regard to equation (1):

$$P_{tx} = \min\left(P_{max}, \frac{(1-\gamma)P_0 + \gamma P_1 SIR_{DL}}{g}\right) \quad (1)$$

where,
$P_{max}$ is the maximum permitted transmission power and parameter g is uplink channel gain from the cell edge mobile station to the desired base station.

In IEEE 802.16e (2005) and the evolving IEEE 802.16m, $P_{max}$ is defined as 23 dBm.

In the equation (1), multiplication of the target mean power transmitted from cell edge mobile stations (parameter $P_1$) by $SIR_{DL}$ allows transmitted power from the cell edge mobile station to be based on the interference level with other cell edge mobile stations. As high $SIR_{DL}$ value means that increasing cell edge mobile station transmitter power does not interfere with other cell edge mobile stations. A low $SIR_{DL}$ value means that increasing cell edge mobile station transmitter power interferes with other cell edge mobile stations.

The equation (1) provides linear balancing between transmitter power of a cell edge mobile station and transmitter power of center cell mobile station.

In an embodiment, the mobile station at cell edge determines transmitter power level using an exponential combination described with regard to equation (2):

$$P_{tx} = \min\left(P_{max}, \frac{P_0^{(1-\beta)} \cdot (P_1 SIR_{DL})^\beta}{g}\right) \quad (2)$$

The equation (2) provides exponential balancing between transmitter power of a cell edge mobile station and transmitter power of center cell mobile station.

Figure 3:
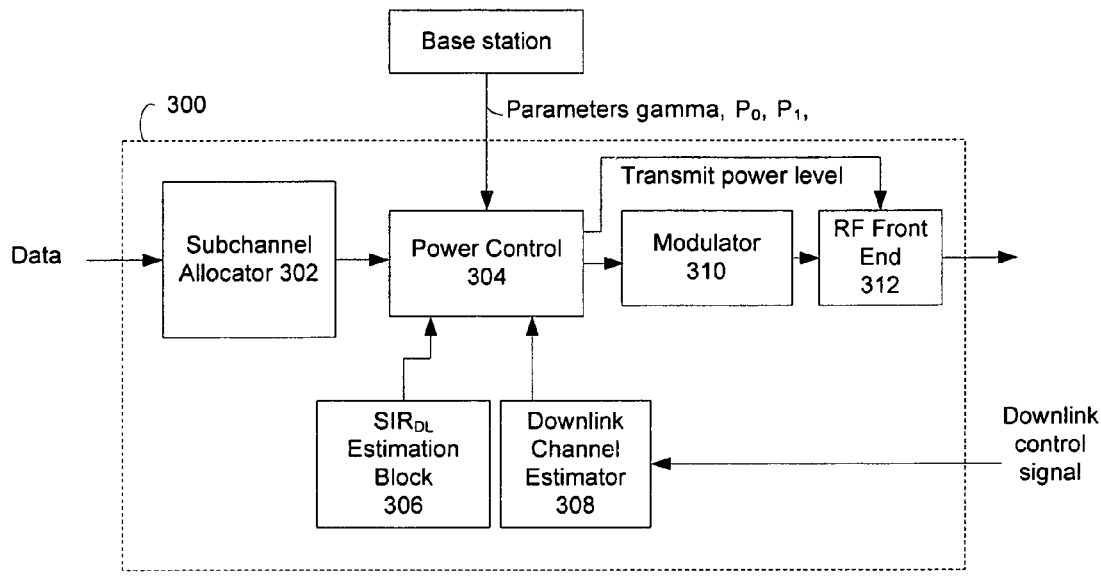
FIG. 3 depicts a high-level block diagram of a mobile station that determines transmitter power, in accordance with an embodiment.

FIG. 3 depicts a high-level block diagram of a mobile station that determines transmitter power, in accordance with an embodiment. To transmit signals, mobile station 300 uses subchannel allocator 302, power control block 304, signal to interference ratio estimation block 306, downlink channel estimator 308, modulator 310, and RF front end 312. Subchannel allocator 302 receives data that is to be transmitted and allocates the data to a subchannel. Power control block 304 determines an uplink signal power for the data to be transmitted based in part on parameters $P_0$, $P_1$, $\gamma$, $SIR_{DL}$, and downlink channel gain. Power control block 304 determines an uplink signal power for the data to be transmitted using techniques described with regard to FIG. 2. A base station may transmit parameters $P_0$, $P_1$, $\gamma$ to mobile station 300.

$SIR_{DL}$ estimation block 306 may determine the parameter $SIR_{DL}$ based in part on a preamble or pilot transmitted from the desired base station and base stations of other cells. $SIR_{DL}$ estimation block 306 may determine the parameter $SIR_{DL}$ using techniques described with regard to FIG. 2.

Downlink channel estimator 308 may determine channel gain, parameter g, used to determine uplink signal power based in part on preambles or pilots in data transmitted from a base station to the cell edge mobile station. Downlink channel estimator 308 may determine channel gain, parameter g, using techniques described with regard to FIG. 2.

Modulator 310 performs signal modulation using techniques such as but not limited to OFDM and OFDMA.

RF front end 312 may apply the transmitter power level specified by power control block 304 and transmit a radio frequency signal including the data.

Figure 4:
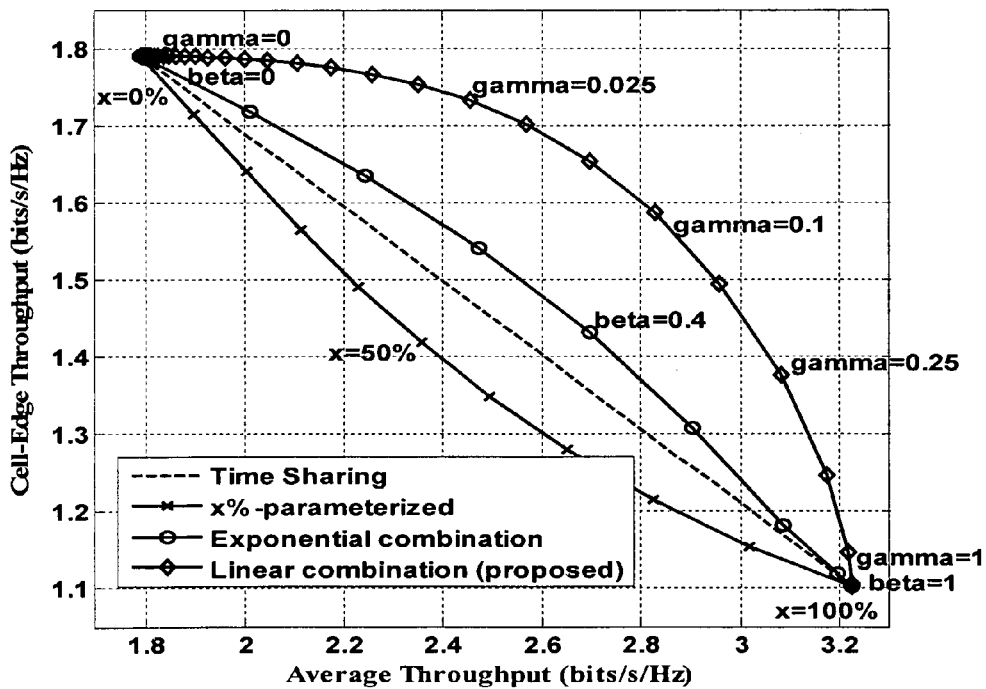
FIG. 4 depicts average/cell-edge throughput tradeoff curves for different power control schemes, in accordance with an embodiment.

FIG. 4 depicts average/cell-edge throughput tradeoff curves for different power control schemes, in accordance with an embodiment. The x-axis and y-axis indicate average throughput for all mobile stations in a cell and throughput of a mobile station at cell-edge, respectively. The time-sharing scheme (described in IEEE 802.16e (2005)) has a straight line connecting two extreme points. In the time-sharing scheme, power control is switched between two schemes: (1) SNR-based scheme (optimum for maximizing cell-edge throughput) and (2) INR-based scheme (optimum for maximizing average throughput). The SNR-based scheme can be used for some portion of frames, whereas the INR-based scheme can be used for the remaining frames. The exponential combination scheme (described with regard to equation (2)) has a concave curve based on parameter $\beta$, so it has better throughput tradeoff performance than the time-sharing scheme. However, the linear combination scheme (described with regard to equation (1)) has the best tradeoff performance between average throughput for all mobile stations in a cell and throughput of a mobile station at cell-edge as compared to the time-sharing scheme and exponent-combination scheme.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
selectively setting transmitter power of a mobile electronic device based in part on a signal-to-interference-power ratio, wherein the signal-to-interference-power ratio is based on signals transmitted from base stations of different cells based also in part on a balance of power transmitted by at least one mobile station near cell edge and power transmitted by at least one mobile station closer to cell center, target mean received power by a base station from at least one mobile station near cell center, target mean power transmitted from at least one mobile station near cell edge, channel gain, and a weighting parameter, wherein the selectively setting transmitter power of a mobile station comprises determining:

$$P_{tx} = \min\left(P_{max}, \frac{(1-\gamma)P_0 + \gamma P_1 SIR_{DL}}{g}\right).$$

2. The method of claim 1, further comprising:
receiving at the mobile electronic device from a base station:
the balance of power transmitted by at least one mobile station near cell edge and power transmitted by at least one mobile station closer to cell center, target mean received power by a base station from at least one mobile station near cell center, and target mean power transmitted from at least one mobile station near cell edge.

3. The method of claim 1, wherein the signal-to-interference-power ratio is based on signals transmitted from a base station associated with a cell of the mobile station and at least one base station of another cell.

4. The method of claim 3, wherein the signal-to-interference-power ratio is based on channel conditions of the base stations that transmit the signals.

5. The method of claim 1, wherein the channel gain is based on a downlink channel gain.

6. A method comprising:
selectively setting transmitter power of a mobile electronic device based in part on a signal-to-interference-power ratio, wherein the signal-to-interference-power ratio is based on signals transmitted from base stations of different cells based also in part on a balance of power transmitted by at least one mobile station near cell edge and power transmitted by at least one mobile station closer to cell center, target mean received power by a base station from at least one mobile station near cell center, target mean power transmitted from at least one mobile station near cell edge, channel gain, and a weighting parameter, wherein the selectively setting transmitter power of a mobile station comprises determining:

$$P_{tx} = \min\left(P_{max}, \frac{P_0^{(1-\beta)} \cdot (P_1 SIR_{DL})^\beta}{g}\right).$$

7. A mobile station comprising:
logic to determine a transmit power level based in part on a signal-to-interference-power ratio, wherein the signal-to-interference-power ratio is based on signals transmitted from base stations of different cells, wherein the logic to determine a transmit power level is to determine:

$$P_{tx} = \min\left(P_{max}, \frac{(1-\gamma)P_0 + \gamma P_1 SIR_{DL}}{g}\right); \text{ and}$$

transceiver circuitry to transmit signals at the determined transmit power level.

8. The mobile station of claim 7, wherein the logic to determine a transmit power level is to determine a transmit power level based also in part on a balance of power transmitted by at least one mobile station near cell edge and power transmitted by at least one mobile station closer to cell center, target mean received power by a base station from at least one mobile station near cell center, target mean power transmitted from at least one mobile station near cell edge, and channel gain.

9. The mobile station of claim 8, further comprising:
logic to determine the signal-to-interference-power ratio; and
logic to determine the channel gain.

10. The mobile station of claim 7, wherein the signal-to-interference-power ratio is based on signals transmitted from a base station associated with a cell of the mobile station and at least one base station of another cell.

11. The mobile station of claim 10, wherein the signal-to-interference-power ratio is based on channel conditions of the base stations that transmit the signals.

12. The mobile station of claim 9, wherein the channel gain is based on a downlink channel gain.

13. A mobile station comprising:
logic to determine a transmit power level based in part on a signal-to-interference-power ratio, wherein the signal-to-interference-power ratio is based on signals transmitted from base stations of different cells, wherein the logic to determine a transmit power level is to determine:

$$P_{tx} = \min\left(P_{max}, \frac{P_0^{(1-\beta)} \cdot (P_1 SIR_{DL})^\beta}{g}\right).$$

14. The method of claim 6, wherein the signal-to-interference-power ratio is based on signals transmitted from a base station associated with a cell of the mobile station and at least one base station of another cell.

15. The method of claim 14, wherein the signal-to-interference-power ratio is based on channel conditions of the base stations that transmit the signals.

16. The method of claim 6, wherein the channel gain is based on a downlink channel gain.

17. The mobile station of claim 13, wherein the logic to determine a transmit power level is to determine a transmit power level based also in part on a balance of power transmitted by at least one mobile station near cell edge and power transmitted by at least one mobile station closer to cell center, target mean received power by a base station from at least one mobile station near cell center, target mean power transmitted from at least one mobile station near cell edge, and channel gain.

18. The mobile station of claim 17, further comprising:
logic to determine the signal-to-interference-power ratio; and
logic to determine the channel gain.

19. The mobile station of claim 13, wherein the signal-to-interference-power ratio is based on signals transmitted from a base station associated with a cell of the mobile station and at least one base station of another cell.

20. The mobile station of claim 19, wherein the signal-to-interference-power ratio is based on channel conditions of the base stations that transmit the signals.

21. The mobile station of claim 18, wherein the channel gain is based on a downlink channel gain.

* * * * *